United States Patent [19]
Schwartz et al.

[11] 4,035,089
[45] July 12, 1977

[54] MECHANISM FOR VARYING THE FINGER GRIP AREA OF A WRITING IMPLEMENT

[76] Inventors: Allan E. Schwartz, 3 Bristol Place, Yonkers, N.Y. 10710; Richard E. Frenkel, 17 Kingston Road, Scarsdale, N.Y. 10583

[21] Appl. No.: 625,669

[22] Filed: Oct. 24, 1975

Related U.S. Application Data

[63] Continuation-in-part of Ser. No. 341,157, March 14, 1973, Pat. No. 3,915,021.

[51] Int. Cl.² .................................... B43K 7/00
[52] U.S. Cl. .................................. 401/6; 273/81 R; 15/443; 294/86.24; 74/551.9
[58] Field of Search ............... 401/6; 273/81 R, 75; 15/144.5, 443, 444; 145/61 R, 29; 294/86.24; 74/551.9

[56] References Cited
U.S. PATENT DOCUMENTS

| 366,218 | 7/1887 | Jeffery | 74/551.9 X |
|---|---|---|---|
| 586,830 | 7/1897 | Williams | 74/551.9 |
| 605,626 | 6/1898 | Blanchard | 74/551.9 |
| 1,971,681 | 8/1934 | Hauton | 401/6 |
| 2,173,451 | 9/1939 | Lorber | 401/6 |
| 2,235,841 | 3/1941 | Monnet | 145/61 R X |
| 2,603,260 | 7/1952 | Floren | 273/81 R X |

*Primary Examiner*—Lawrence Charles
*Attorney, Agent, or Firm*—Arthur Dresner

[57] ABSTRACT

The mechanism for varying the diameter of a body in accordance with this invention is defined by a mechanism in which the grip area intended for expansion comprises a plurality of compressible O-ring elements supported by a cylindrical body section and spaced apart by spacer elements. A stationary end plate which may be formed by the tip portion of a writing implement, forms an abutment against which an end O-ring will be forced for compression. An axially movable adjustment member is also carried on the cylindrical body for engagement with the opposite end O-ring so that as the adjustment member is moved toward the abutment member the plurality of O-rings therebetween will be compressed so that their cross-sectional shapes will be deformed from circular to elliptical thus enlarging the overall outside diameter of the grip portion.

6 Claims, 14 Drawing Figures

MECHANISM FOR VARYING THE FINGER GRIP AREA OF A WRITING IMPLEMENT

CROSS REFERENCE

This is a continuation-in-part of copending application Ser. No. 341,157, filed on Mar. 14, 1973, and now U.S. Pat. No. 3,915,021.

BACKGROUND OF THE INVENTION

This invention relates generally to the area of hand-held devices, such as tools, sporting equipment, household and garden equipment, or to other generally cylindrical bodies, but more specifically to writing implements having a finger grip area and a mechanism for varying the diameter of the finger grip area of the writing implement in order to make the finger grip area more comfortable for use.

Although the mechanism forming the subject of the present invention is specifically directed to means for varying the diameter of the finger grip area of writing implements, it is also useful for varying the diameter of any substantially cyclindrical body whether it be useful as a writing implement or not. For example, the diameter of rollers which may be used as guide means in sheet feeding or web feeding apparatus' such as printing or reproducing devices, may be varied through the use of this mechanism. In such cases additional means may be provided remote from the body for effecting the required adjustments.

Various hand-held tools or appliances are typically manufactured with a single standard grip for handles size as the manufacture of a variety of sizes which would comfortably fit the infinite sizes of the hand for different people would be excessively costly and probably confusing to the consumer. However, the use of a tool would be rendered more efficient if the handle size would be designed to fit the hand of its particular user. Only in a select few areas such as tennis rackets are a variety of grip or handle sizes available to the consumer. Even in this area however, a large number of grip sizes must be stocked by the supplier so that the consumer will have his choice. It would be of significant advantage if the supplier's stock would be standardized so that only a single handle or grip with a means for varying the size of the handle so as to comply with the particular consumer's requirements could be stocked Other areas of sports would suggest the desirability of varying the handle sizes, such as in golf, fishing rods, ski pole handles, poles used in pole vaulting, etc.. It appears, however, that varieties of handle sizes in these areas have not been made available to the consumer and it is accordingly one object of the present invention to provide a convenient and easy means for providing a variable handle or grip size to the sportsman in any sports activity where the sporting implement is to be hand-held.

An almost infinite number of uses for such a mechanism can be envisioned. It will be appreciated that any hand-held tool or device having a handle or grip may be provided with a mechanism for varying the size of that handle or grip so that it may be more comfortably and efficiently used for its intended purpose. Such tools such as trowels, hammers, screw drivers, socket wrenches, chisels, soldering irons, hacksaws, wood-saws, wrenches, etc., would be particular tools where variable diameter handles would be quite useful and advantageous. Electric hand-held tools such as electric drills, saws, hedge trimmers, etc. may also be provided with such a mechanism. A variety of household appliances such as irons, razor blade handles, electric knives, hand-held hair-dryers, electric toothbrushes, cooking utensils, pot handles, etc. are also devices which would be rendered more attractive and useful to the consumer if supplied with the simple mechanism according to the present invention for varying its size. A variety of medical equipment, such as surgeons and dentists tools would be more useful when supplied with the added facility of varying its handle size.

The mechanism of the present invention has been found to be most desirable for varying the size of the grip on writing implements. The use of such a mechanism is writing implements is of particular interest since many of these are already provided in a variety of diameter sizes. The provision of such means in a writing implement will also serve to lessen the effects of writing fatigue by providing the user with means for varyng the size of the finger grip area.

It is accordingly the general object of the present invention to provide a simple and easy to use mechanism which may be incorporated in any handle or grip intended for hand-held use so as to vary its size in order to fit the hand more comfortably.

It is a futher object of the present invention to provide a means for varying the grip on the handle of a sporting implement, tool implement or household appliance intended for hand-held use without removing the handle from implement, tool or apparatus.

It is another and more specific object of the invention to provide a mechanism for varying the finger grip size of various types of writing implements.

It is yet another object of the invention to provide a mechanism for varying the diameter of a grip or cylindrical body by simple rotation of an element of said mechanism which is conveniently accessible from the exterior of the handle.

The above object, features and advantages, along with other objects, features and advantages of the present invention will become more apparent from the detailed description of the invention, in conjunction with the accompanying drawings to be described more fully hereinafter.

SUMMARY OF THE INVENTION

The foregoing and other objects of the present invention may be accomplished by providing a mechanism carried within a generally hollow handle or cylindrical body having wall plates for defining the wall structure of the handle or body and which are arranged for radial movement. A shaft (or sleeve) is carried within the hollow portion of the handle being axially arrranged therein and is provided with external theads along a portion of its length. An expander assembly is carried on the threaded portion of the shaft by an internally threaded ring and engages the wall plates. A means for engaging the shaft so as to cause rotation thereof within the handle is provided so that rotational movement may be imparted thereto and is carried by the handle or by the cylindrical body. Upon rotation of the shaft, the portion of the expander element which is carried by the threaded portion of the shaft will be axially moved along the shaft and the expander will be caused to exert radial pressure against the walls so as to expand them and increase the diameter of the handle or body. The expander assembly is attached to the wall plates so that upon rotation of the shaft in the opposite direction, an inward radial force will be exerted on the walls by a collapsing movement of the expander so as to decrease the diameter of the outer walls. A very simple construction of the mechanism according to the invention is achieved when the expander assembly comprises at least two flex elements substantially bow-shaped, and attached at one end thereof to an internally threaded ring carried on the threaded shaft, attached as its other end to a sliding ring, arranged for movement over the unthreaded portion of the shaft with the central portion of the bow secured to opposite wall plates. The diameter of the body can easily be varied by simply causing rotational movement of the shaft which will result in flexing of the flex elements either inwardly or outwardly so as to cause pressure to act against the wall plates.

Another further desirable embodiment of the present invention is particularly suited for use in handles or hollow bodies having non-circular cross-sections. Of particular interest would be a handle having an octagonal cross-sectional shape such as is typically found in tennis rackts. The handle would include two opposed plate members forming the handle body and radially movable with respect to each other. A sleeve or shaft arranged for rotational movement within the handle is axially carried therein and the expander element carried on the shaft and engaging the opposed wall plates comprises an elliptically-shaped body. The opposed vertices of the elliptical body engage opposite walls within the handle. Upon rotation of the shaft the elliptical body will be caused to rotate so that the vertices of the elliptical body will be moved from one point on the wall plate to another position on the wall plate. When the body is housed within an octagonal handle the different points of the wall will be located at different radial positions from the center of the handle so that the body will cause the plates to be moved radially with respect to the center of the handle thus changing the diameter of the handle.

A still further desirable embodiment of the present invention finding particular application in writing implements, but useful in the other areas referred to above, is defined by a mechanism in which the grip area intended for expansion comprises a plurality of compressible O-ring elements supported by a cylindrical body section and spaced apart by spacer elements. A stationary end plate, which may be formed by the tip portion of a writing implement, forms an abutment against which an end O-ring will be forced for compression. An axially movable adjustment member is also carried on the cylindrical body for engagement with the opposite end O-ring so that as the adjustment member is moved toward the abutment member the plurality of O-rings supported on the cylindrical body therebetween will be compressed against each other so that their cross-section shape will be deformed from circular to elliptical, thus enlarging the overall outside diameter of the grip portion. This particular embodiment has a number of distinct advantages in that the size of the grip area may be readily varied, the degree of compressibility can be changed so as to increase or decrease the range of expansion available with a particular set of O-rings, and it is relatively inexpensive, easy to assemble, easy to use and presents an overall attractive arrangement for the user.

The foregoing and other features of the mechanism for expanding the diameter of a body and the various elements of the present invention are more fully described with reference to the following drawings annexed hereto.

DESCRIPTION OF THE INVENTION

Figures 1, 2:
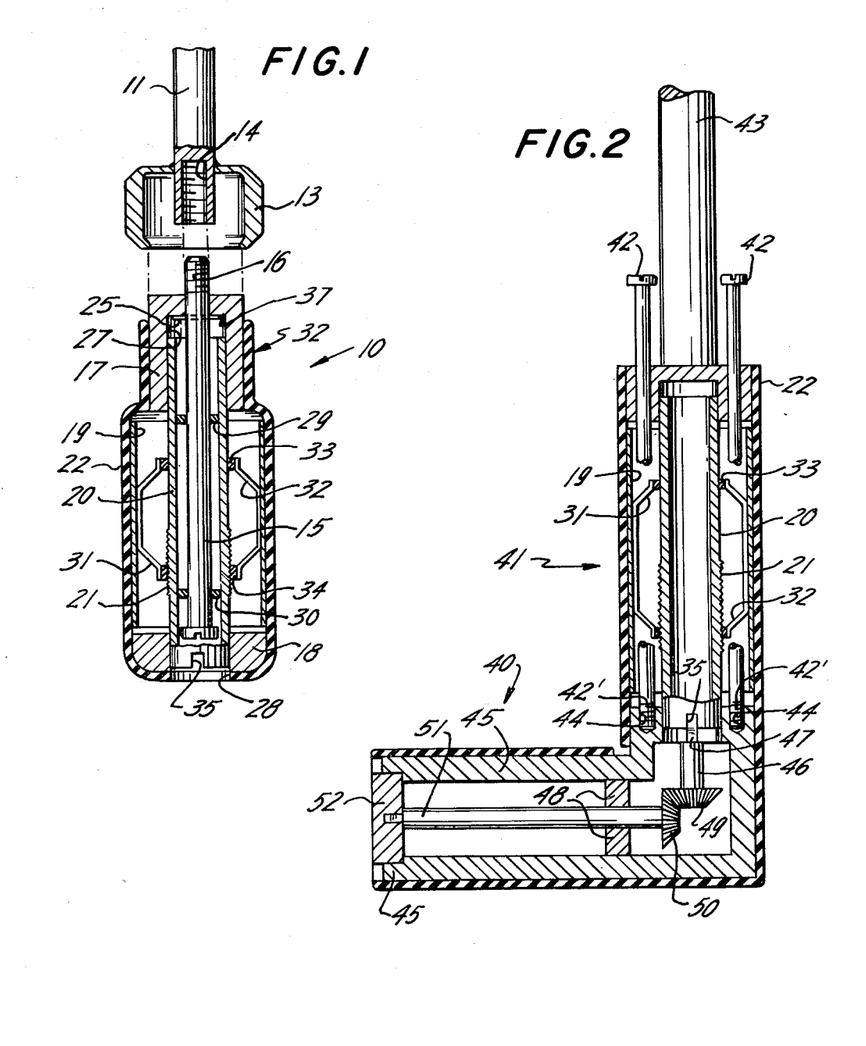
FIG. 1 is a sectional view showing one embodiment of the present invention as applied to a hand-held tool for varying the diameter of its grip.
FIG. 2 is also a sectional view of a handle or substantially cylindrical member with the same mechanism for expanding the diameter thereof as shown in FIG. 1 with means for adjusting said mechanism through a right angle section.

Referring now in detail to the drawings, FIG. 1 shows one type of hand-held tool, particularly a screwdriver, having a handle 10 and a shank 11 which would carry the tool implement such as a screwdriver tip or other such implement like a socket. The shank 11 may be secured to a neck 13 and provided with an internally threaded area 14. The handle 10 is generally hollow and carries a bolt 15 axially extending the length of the handle. The bolt has an externally threaded portion 16 whcih is arranged for engagement with internal threads 14 on the shank so that the handle may be secured to the shank. The handle is provided with upper and lower supports blocks 17 and 18 respectively. These blocks may be formed of pre-molded plastic material. The cross-sectional shape of the handle may be circular, octagonal, or other convenient shape. In any event, the walls of the handle are supported by wall plates 19 which conform to the cross-sectional shape of the handle. A hollow metal sleeve 20 is centrally and axially arranged through the handle 10. Upper block 17 has a partial bore 27 for accommodating the sleeve and lower block 18 has a bore 28 through which the sleeve passes. The bolt 15 is carried within the sleeve 20 and is journalled between teflon O-ring bearings 20 and 30. A roll pin or flange 25 is carried by bolt 15 and engages a shoulder 37 of bore 27 so as to prevent axial movement of bolt 15 when it is secured to the shank 11. The sleeve 20 has an externally threaded portion 21. An expander assembly is carried on the threaded portion of the sleeve for expanding the external diameter of the handle. The expander assembly exerts a force on wall plates 19 which will exert pressure on flexible grip 22 thus varying the outer dimension of grip area of the handle.

The expander assembly comprises at least two flex elements 31 and 32 for expanding the handle in at least two directions. Additional flex elements may be carried on the sleeve so as to expand the size of the handle in additional directions. Each flex element, preferably bow shaped and made of spring steel is connected at one end to an axially movable slide ring 33 at its center to plates 19, and the other end to an internally threaded ring 34 which is in engagement with the external threads on the sleeve. The flex elements may be secured to the wall plates, slide ring and threaded ring such as by spot welding or riveting.

Sleeve 20 has a slot 35 at one end thereof which is exposed through bore 28. Rotation of the sleeve 20 may be effected by applying a tool to the slotted end 35 and rotating the tool while in the slot.

Figure 8:
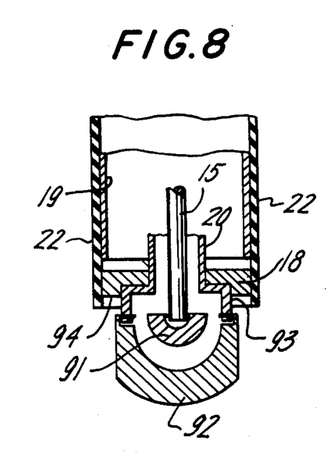
FIG. 8 is a partial sectional view showing one means of adjusting the mechanism according to the invention.

Alternative means for causing rotation of the sleeve 20 and bolt 15 may be carried by the sleeve and bolt directly as shown in FIG. 8. A bolt removal key 91 is pivotally carried at the end of bolt 15 and may be recessed within enlarged diameter portion 93 of sleeve 20. The sleeve 20 carries an adjustment key 92 which may be carried in recess 94 of support block 18 when not in use.

Upon such rotation, in one direction, threaded ring 34 will be caused to axially move along sleeve 20 in a direction away from the slotted end of the sleeve. This is a result of the bowed portion of the flex elements being secured to the wall plates. Simultaneously, slide ring 33 will slide along the unthreaded portion of the sleeve in a direction opposite to that of ring 34. As a result, flex elements 31 and 32 will be caused to exert an outward pressue against the wall plates thus expanding the outside dimensions of the handle. Upon rotation of the sleeve in the opposite direction internally threaded ring 34 will move in a direction toward the slotted end 35 of sleeve 20 and slide ring 33 will move in a opposite direction, thus causing flex elements 31 and 32 to exert an inwardly directed pressure on the wall plates, thus resulting in collapsing of the flex elements and a decrease in the outside dimension of the handle.

In FIG. 2, an L-shaped handle 40 is provided with the expander mechanism in one leg 41 of the handle only. Leg 41 is attached via means of screws 42 to an instrument or tool shaft 43. The screws 42 are shown broken away so as not to interfere with a clear understanding of the expander mechanism, and are provided with ends 42' which are externally threaded so as to engage internally threaded slots 44 provided within the handle body so as to provide securement means.

The handle is provided with a grip 22 as in FIG. 1, and a similar expander mechanism comprising rotatably carried sleeve 20 with threaded portion 21, flex elements 31 and 32 carried on slide rings 33 and 34 are provided within leg 41 of the handle 40. A solid shaft may be provided instead of hollow sleeve 20. The bowed-out portions of the flex elements 31 and 32 are secured to wall plates 19. The rotation of the sleeve 20 so as to effect expansion of the handle portion 41 is effected through the gear and shaft arrangement carried within leg portion 45 of the handle 40. A first shaft 46 is axially oriented with respect to sleeve 20 and carries a key 47 for engaging slotted-end 35 of the sleeve. A molded bearing may be provided for journalling the shaft 46. A first beveled gear 49 is carried at the end of shaft 46 opposite the key 47. A second shaft 51 is carried within leg 45 being supported by molded bearing 48 and an end adjusting nut 52. A second beveled gear 50 is carried at the end of shaft 51 remote from the nut 52 and in engagement with the first beveled gear 49. As a result of adjustment of end nut 52, which may be effected by use of a key such as shown in FIG. 8, rotational movement may be imparted to shaft 51 and transmitted through the beveled gear arrangement 49, 50 to shaft 46 so as to cause rotational movement of the sleeve 20 thus effecting expansion of the leg 41 of L-shaped handle 40.

Figure 3:
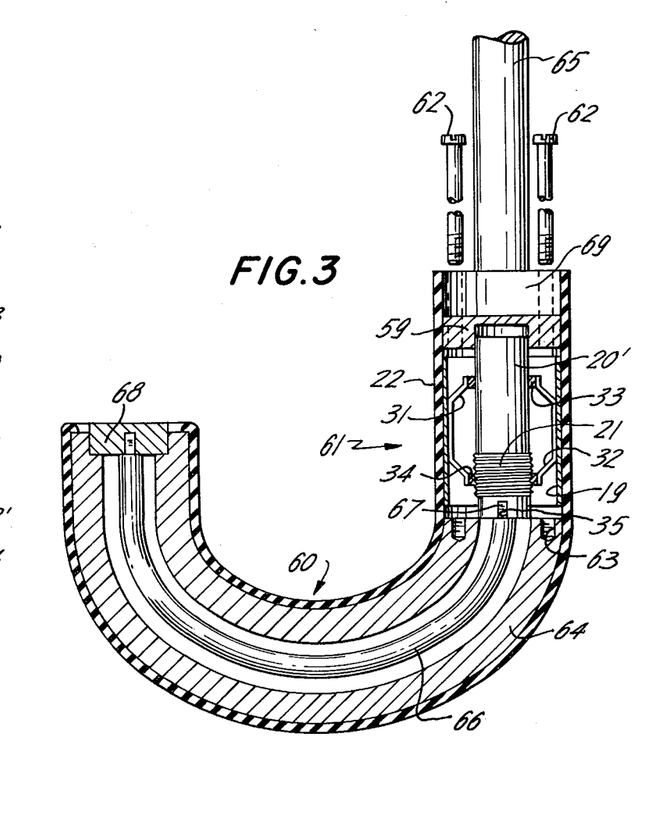
FIG. 3 is a sectional view showing a substantially curved cyclindrical body or handle with the same embodiment for expanding the diameter thereof as shown in FIGS. 1 and 2, with means for adjusting said mechanism through said curved handle.

FIG. 3 shows another type of handle which is curved such as might be used on an umbrella. The handle 60 has a portion 61 which is usually held by the user of the umbrella. It is to this portion which the expander assembly is applied. Two screws 62 shown broken away, have threaded ends and are secured in internally threaded slots 63 of the molded handle body 64 for securing the handle to the umbrella shaft 65. Like parts of the expander assembly are designated by like reference numerals as in FIGS. 1 and 2 and further explanation is not believed necessary. It should be noted however that a solid shaft 20' is employed instead of sleeve 20. A flexible shaft 66 is carried in the curved portion of the handle and is provided with a key 67 for engaging the slotted end 35 of the sleeve 20. The flexible shaft is supported at the other end of the handle by adjusting nut 68 and upon adjustment thereof rotation will be imparted to the flexible shaft so as to transmit rotation to the sleeve and effect adjustment of the outer diameter of the handle portion 61.

Figures 7, 9, 10:
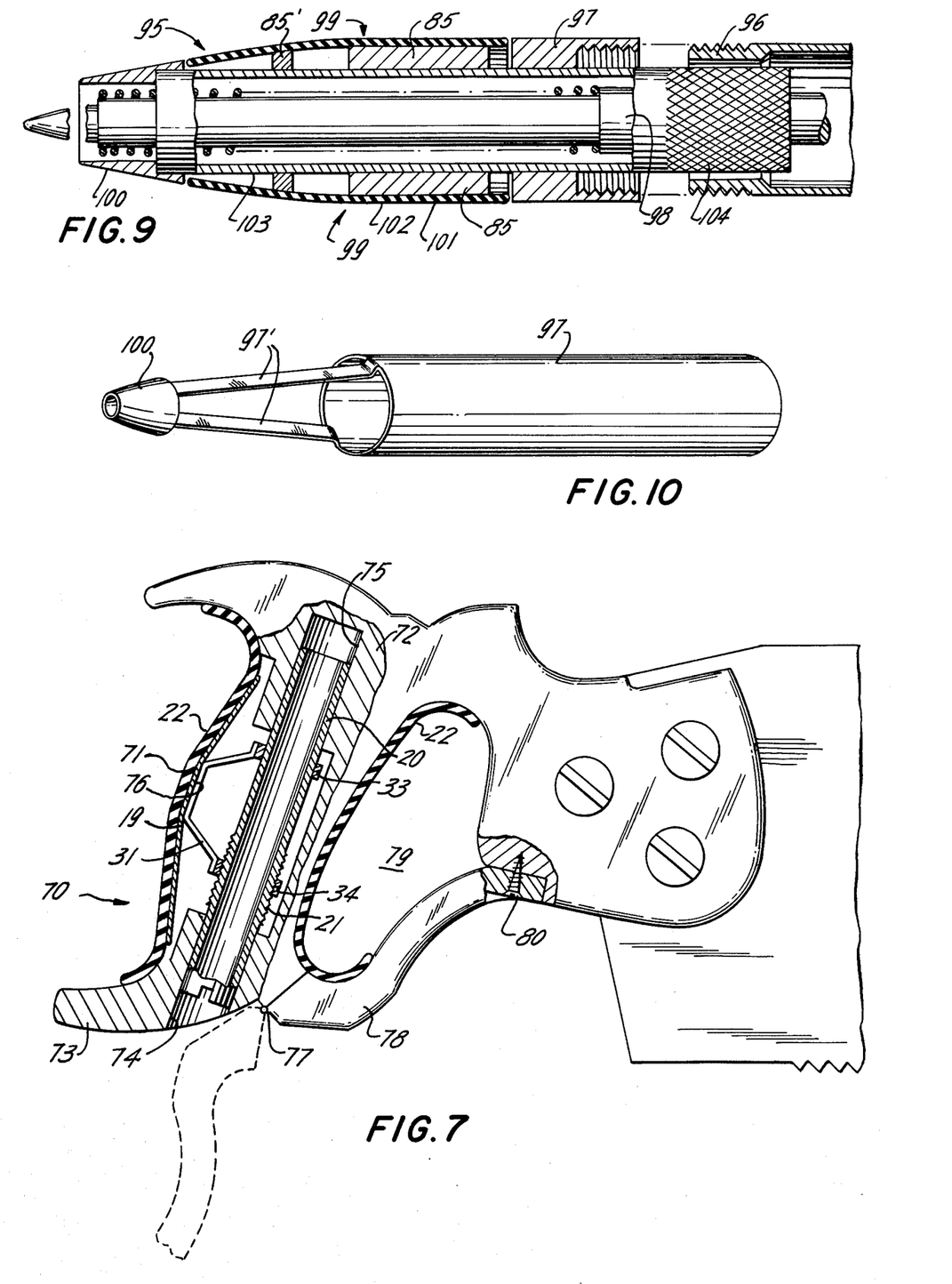
FIG. 7 is a sectional view of a further embodiment of the present invention as applied to another type of hand-held tool.
FIG. 9 is a sectional elevational view showing a writing implement having means for expanding its finger grip area.
FIG. 10. is a perspective view showing one detail of the writing implement shown in FIG. 9.

FIG. 7 shows the application of the expander using the rotating sleeve as applied to the handle 70 of a hand saw. In this embodiment only the rear surface 71 of the handle will be effected by expansion or contraction of the flex element 31 as only this single flex element is provided. The rotating sleeve 20 is supported between handle bodies 72 and 73. The handle body 73 has a bore 74 for accommodating the sleeve and handle body 72 has a bore 75 for accommodating the other end of the sleeve. The single flex element is carried on rings 33 and 34 and is secured at its bowed-out portion to the wall plate 19 at 76. As in the previous embodiments, a flexible grip 22 covers the hand-held area of the handle. Finger guard 78 enclosing the finger space 79 is hingedly connected to handle body portion 73 at one end thereof and secured in place at its other end by screw 80. The finger guard may be lowered by removing screw 80 thus allowing removal of the grip 22 and replacement thereof if necessary.

Figure 4:
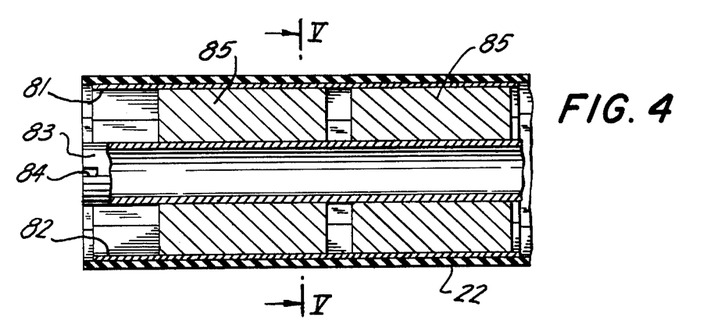
FIG. 4 is a sectional view taken along lines IV-IV of FIG. 5 showing another embodiment of the invention for varying the diameter of a handle or cylindrical body.
Figure 5:
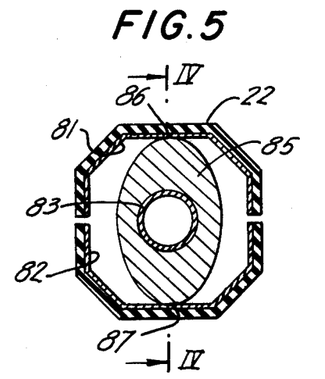
FIG. 5 is a sectional view taken along lines V-V of FIG. 4 showing the mechanism of FIG. 4 in one operative position.
Figure 6:
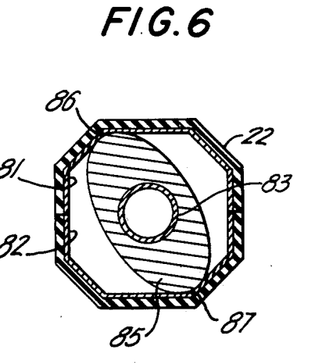
FIG. 6 is a sectional view similar to that of FIG. 5 showing the mechanism of FIG. 4 for expanding the diameter of the handle in another operative position.

A further embodiment of the present invention is shown in FIGS. 4, 5 and 6. This embodiment is particularly suited for use in non-circular cross-sectional handles or bodies such as a typical tennis racket havin an octagonal handle. FIG. 5 shows such a handle in cross-sectional view. The handle body is substantially hollow and is supported by wall plates 81 and 82. The usual grip covering of 22 is carried by the handle. A sleeve or shaft 83 is axially supported within the hollow handle and has a slotted end 84 exposed at one end of the handle. Rotation of the sleeve may be effected by application of an appropriate tool within slot 84. A key, such as key 91 carried by bolt 15 in FIG. 8 may also be carried by shaft 83 for effecting rotatiion thereof instead of slotted end 84. An expander element 85 is carrid by the sleeve 83. The expander element 85 is substantially elliptical in cross-section with its vertices 86 and 87 engaging opposite wall plates 81 and 82 respectively. Upon rotation of the sleeve 83 the expander element 85 will rotate in the same direction acting on opposite wall plates 81 and 82 in a cam-like manner. FIG. 6 shows the handle in its unexpanded position with the vertices 86 and 87 of the expander element located within opposite angles of the octagonal cross-sectional handle. Upon rotation of sleeve 83, the expander element may be moved to the position shown in FIG. 5 with vertices 86 and 87 located adjacent opposite parallel sides which in the position of FIG. 6 are located closer to the center of the handle so that the handle is spread apart upon movement to the position of FIG. 5.

Additional means may be provided such as spring elements between wall plates 81 and 82 so as to cause the opposite sides. of the handle to move together upon subsequent rotation of the expander element back to the position shown in FIG. 6.

The expander element 85 may be formed by a series of cam-like expander elements rather than a single extended element. FIG. 4 shows two such elements.

In FIG. 9, there is shown a writing implement 95 having an upper casing 96 and a lower casing 97. The lower casing 97 is connected to tip 100 by struts 97' as shown in FIG. 10. The upper and lower casings having external and internal threads respctively for joining one to the other in the typical well-known fashion. The implement may be provided with the typical spring-loaded ink cartridge 98. A finger grip area 99 is carried by the lower casing 97 between struts 97' and is provided with at least two movable walls 101 and 102 arranged similar to wall plates 81 and 82 of FIGS. 4, 5 and 6 having octagonal internal surface while the outside surface is substantially circular. A hollow sleeve 103 is axially supported within the casing and carries the ink cartridge. An expander element 85 is carried by the sleeve 103. The expander 85 is elliptical as described with reference to FIGS. 4, 5 and 6 and upon rotation of the sleeve 103 will exert pressure on walls 101 and 102 to cause variation of its diameter. An additional expander 85' may be provided in the tapered section of the finger grip area. Sleeve 103 has a knurled end 104 to facilitate causing rotation. Thus a writing implement is provided having means for varying the diameter of the finger grip area.

Figure 11:
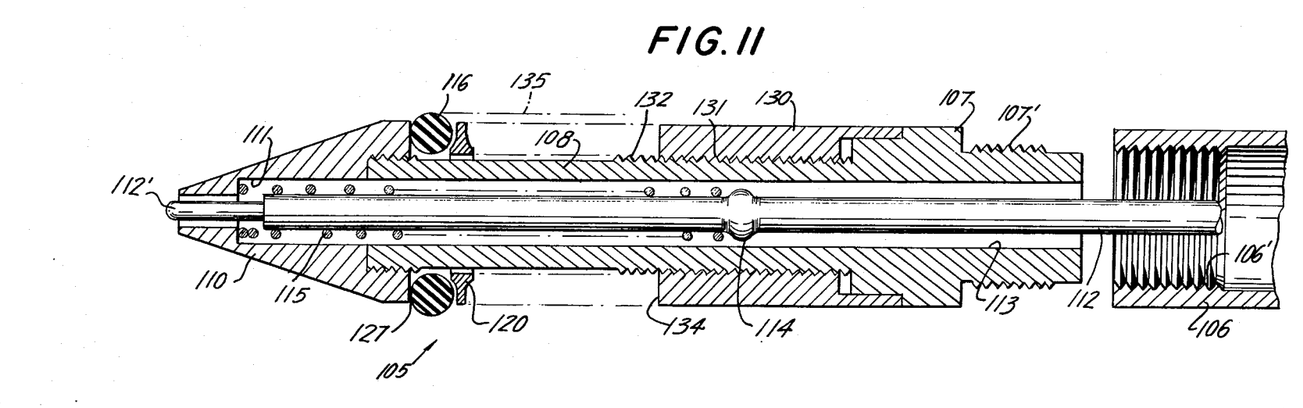
FIG. 11 is a sectional view showing a writing implement having additional means forming a further embodiment of the present invention for expanding its finger grip area.
Figure 12:
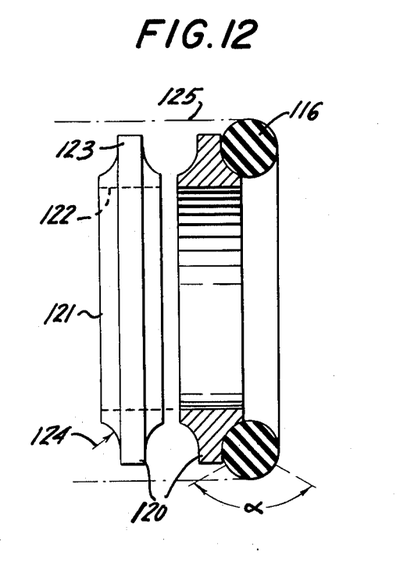
FIG. 12 is an enlarged cross-sectional detail of various elements shown in FIG. 1.
Figure 13:
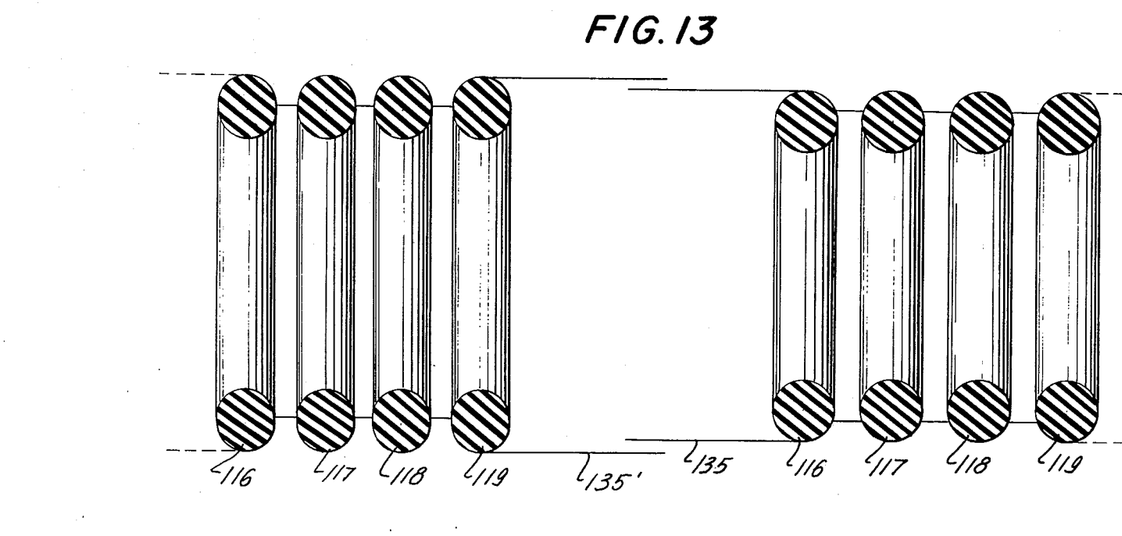
FIG. 13 shows in schematic representation, the before and after representation of the expander mechanism shown in FIG. 11.

FIGS. 11, 12, and 13 show another form of an expander mechanism also useful in writing implements and having a number of advantages over the other embodiments described herinabove. For example, in the embodiment shown in FIGS. 11 through 13 the requirement for movable wall piates is eliminated and the use of complicated structural elements such as the flex elements or cam members shown in the previous embodiments is avoided. Additionally the present embodiment insures uniform expansion of the grip area in all radial directions so that use will be more practical and more desirable.

The writing implement 105 of this embodiment includes an upper casing 106 and a lower casing 107. The lower casing 107 has a cylindrical body portion 108 of reduced diameter for supporting thereon the compressible O-ring members to be defined more fully hereinafter. One end of the body section 108 is threaded for removeably carrying thereon a tip 110 of conventional design and configuration having a central bore 11 for accommodating therethrough the typical ink cartridge 112. Lower casing 107 also has a central bore 113 which will be aligned with the cenral bore 11 of the tip 110 when the tip 110 is assembled with the body section 108, so that the ink cartridge 112 will be accommodated therein in the typical manner. The ink cartridge has the usual abutment means 114 so that the usual compression spring 115 will urge the cartridge into a retracted position to allow a retraction mechanism carried in the upper casing 106 (not shown and forming no part of the present invention) to cause the cartridge to be withdrawn in the body section so that the exposed tip 112' of the ink cartridge can be withdrawn into the central bore of the tip 110.

The upper casing 106 may be detachably secured to the lower section 107 to form a completed writing implement assembly by threaded sections 106' and 107' respectively.

A plurality of compressible O-ring members 116, 117, 118, 19 et seq are carried on the cylindrical body section of reduced diameter 108. A plurality of spacer elements 120 having an inside diameter approximately equal to or slightly greater than the outside diameter of reduced body section 108 is slidably carried thereon for supporting each of the O-rings and providing adequate spacing between them. Each spacer element comprises a collar 121 having a central bore 122 and a flange 123. The transition between the flange 123 and the collar 121 has a radius of curvature 124 approximately equal to the cross-sectional radius of the O-rings so as to form a socket or a seat for the O-rings.

An axially movable adjustment barrel 130 is carried on the body section 108. In the embodiment shown herein, the adjustment barrel 130 has internal threads 131 for mating engagement with external threads 132 carried on the body section 108 so that axial movement of the barrel section 130 can be affected by rotation thereof. Axial movement of the adjustment barrel 130 in the direction of tip 110 will cause the plurality of O-ring members 116, which is carried on the body section 108 located between the adjustment barrel 130 and tip 110, to become compressed. The O-ring member 116 located adjacent the tip 110 will be abutting against surface 127 forming an abutment end of the tip, while the O-ring member adjacent the adjustment barrel 130 will be abutting abutment end 134 of the barrel.

The exposed surface (extending through angle α — see FIG. 12) of each O-ring forms the finger area of the writing implement. In effect therefore the user of the writing implement will be contacting the O-ring elements themselves which present a bumpy or non-slip surface which is both comfortable to use and as understood expandable.

In order to vary the outside diameter of the finger grip area (indicated by reference numeral 135) the adjustment barrel 130 will be rotated in one direction so that its abutment end 134 will be caused to move in a direction toward the abutment end 127 of tip 110, thus compressing each of the O-ring members located therebetween and varying its cross-sectional shape from circular in an uncompressed state in elliptical when fully compressed. The degree of compression determines the degree of elliptical shape. The greater the compression the greater the large diameter of the elipse of each O-ring until it reaches a fully compressed state.

FIG. 13 illustrates the compression effect of the various O-rings. On the right side of the figure O-rings 116 through 119 are shown in their uncompressed state with their cross-sectional shape fully circular with the overall diameter of the grip portion indicated at 135. The left side of the figure shows the condition of the same O-ring members when compressed thus having an elliptical cross-section and the overall diameter of the grip area 135 having been enlarged.

Figure 14:
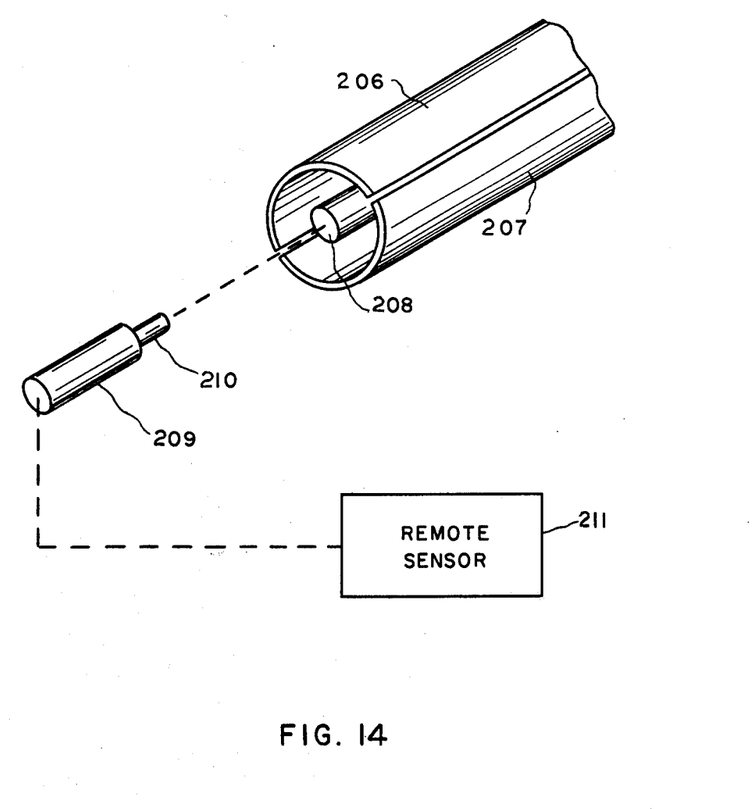
FIG. 14 is a schematic representation of remote control adjustment means.

FIG. 14 schematically shows means for adjusting the expander which may be carried in a cylinder for varying the diameter of a body, such as may be used in a printing press, brake drums, etc. Expandible wall plates 206 and 207 would be carried within the cylinder. Shaft 208 is rotatably arranged within the wall plates and carries an expander mechanism such as elements 85 previously described or attached to adjustment barrel 130 of FIG. 11. Upon rotation of shaft 208 the expanders will exert a force upon the wall plates to vary the diameter of the cylindrical body. A motor 209 may be housed within the cylinder, or otherwise conveniently mounted so that its output shaft 210 is coupled to shaft 208 in order to cause rotation thereof. The motor may be energized by a remote sensor 211 which may be actuated by a variety of external stimuli.

While the invention has been described and illustrated with respect to certain embodiments which give satisfactory results, it will be understood by those skilled in the art, after understanding the purpose of the invention that various other changes and modifications may be made without department from the spirit and scope of the invention, and it is therefore intended in the appended claims to cover all such changes and modifications.

What we claim is:

1. A writing implement having an outer casing, a substantially cylindrical main body portion, means carried within said body portion for producing legible markings and having a writing tip exposed at one end of said body portion, said body portion having an area of reduced diameter to accommodate thereon a finger grip section, said finger grip section comprising a pluraltiy of compressible O-ring members axially aligned along said main body portion, a plurality of annularly shaped spacer elements carried on said main body portion and located between adjacent O-ring members, said spacer elements having an inside diameter approximately equal to the outside diameter of said reduced diameter area of said body portion so as to be supported thereon and having as flange and curved transition surface between said flange and the major surface of said element on both sides thereof, thus forming a contoured cross-sectional shape, said transition surface having a radius of curvature approximately equal to the cross-sectional radius of said O-rings forming a supporting socket therfore which has a shape complementary with the circumferential shape of adjacent O-ring members to provide support therefore, first and second abutment members carried on said body section and located on opposite sides of said finger grip section, one of said abutment members being axially movable toward and away from the other abutment member to effect compression of said O-ring members when said movable abutment member is moved toward the other abutment member so that the radial distance between said body section and the circumference of said O-ring members is increased when said abutment member is moved in one direction and decreased when said abutment member is moved in the other direction, thus varying the diameter of said finger grip section.

2. The writing implement according to claim 1 wherein said movable abutment member comprises a barrel, the outer surface of which forms a part of the outer casing of said writing implement, said barrel having an abutment surface at one end thereof for engaging said finger grip section and being internally threaded for meshing engagement with external threads carried on said main body portion, so that upon rotation of said barrel said abutment surface will be axially moved toward and away from said finger grip section to increase and decrease respectively the compressive forces applied to said finger grip section, whereupon the outer diameter of said finger grip section will increase and decrease respectively.

3. The writing implement according to claim 2, wherein said outer abutment member comprises a substantially conically shaped tip member having a central bore aligned with said cylindrical main body portion to house therein said writing tip of said means for producing legible markings, said conically shaped tip member having an abutment surface axially opposed to the abutment surface of said movable abutment member so that said finger grip section will be positioned therebetwen.

4. The writing implement according to claim 1 wherein each of said O-ring members have the same outside diameter and cross-sectional diameter.

5. A mechanism for varying the diameter of a finger grip area on a writing implement, said writing implement having a main body portion, an ink cartridge carried within said main body portion having a writing tip extending beyond said body portion, a substantially conically shaped tip member connected at one end to said main body portion, said mechanism comprising a plurality of equally sized deformable O-ring carried on said main body portion, the outer surface of said O-rings, forming said finger grip area, annular spacer elements carried on said main body portion and positioned between said O rings, each of said spacer elements comprising a disc having a central bore so as to be carried on said main body portion and a contoured outer circumferential surfce, said contoured surface having a radius of curvature approximately equal to the cross-sectional radius of said O-ring elements so that adjacent O-ring element will fit within said area of curvature complementarily within said contoured surface of said spacer element, said contoured surface being located on both sides of said element so that spacer elements provide a socket for supporting thereon said O-ring elements, and an adjustment barrel carried on said cylindrical body for axial movement therealong to apply an axial force on said O-rings causing compression thereof and deformation of each of said O-ring elements to vary the diameter of said finer grip area. said conically shaped tip forming an abutment stop to engage one of said O-ring elements at an axial end of said plurality when said axial force is applied thereto.

6. The mechanism according to claim 5 wherein said adjustment barrel carries internal threads for meshing engagement with external threads carried on said main body portion so that upon rotation thereof said adjustment barrel will be moved axially along said main body portion for applying said axial force.

* * * * *